June 13, 1939.                H. W. McPHERSON ET AL                2,162,512
                         AIR CONDITIONING SYSTEM FOR AUTOMOBILES
                         Filed Nov. 25, 1935            3 Sheets-Sheet 2
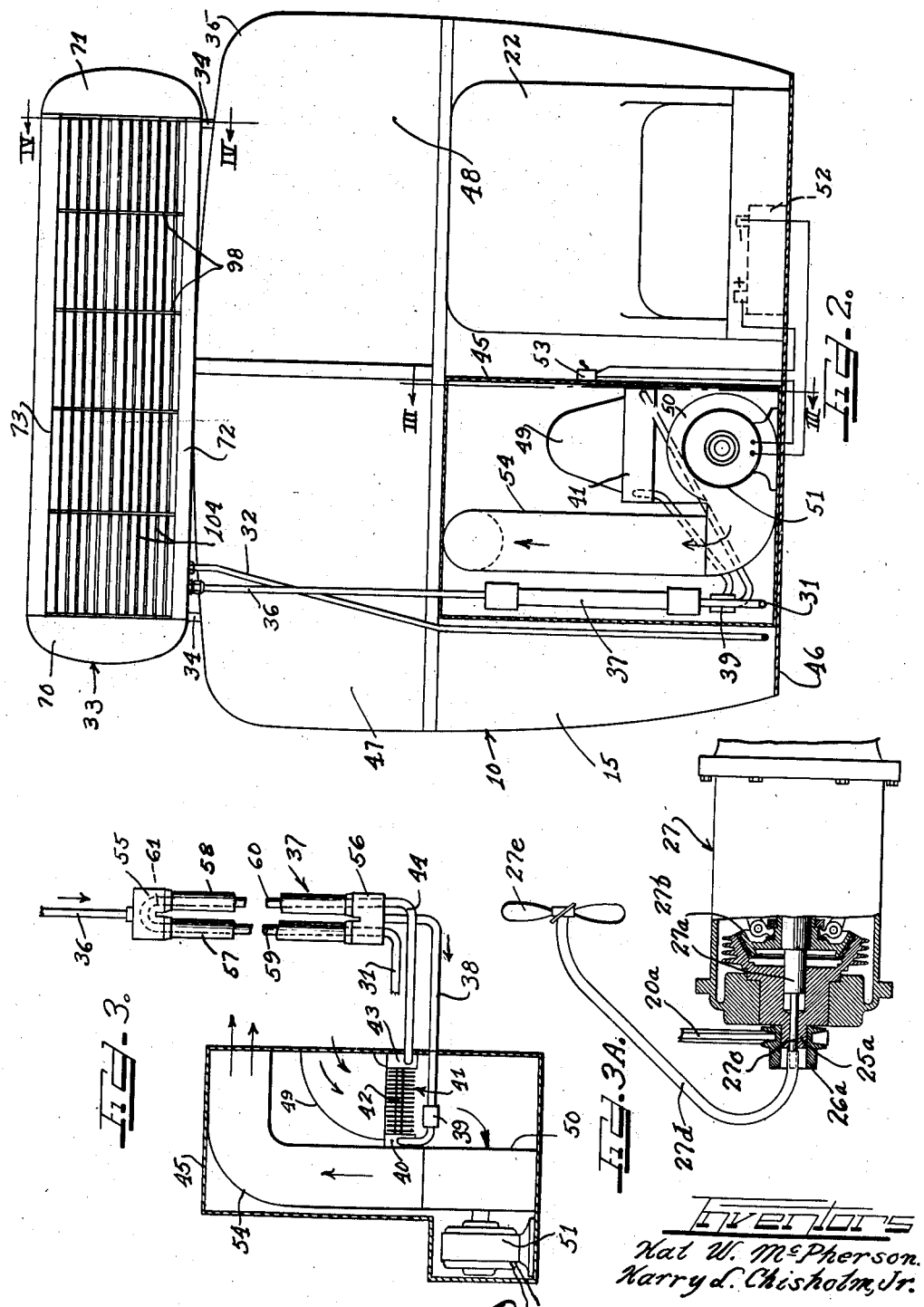

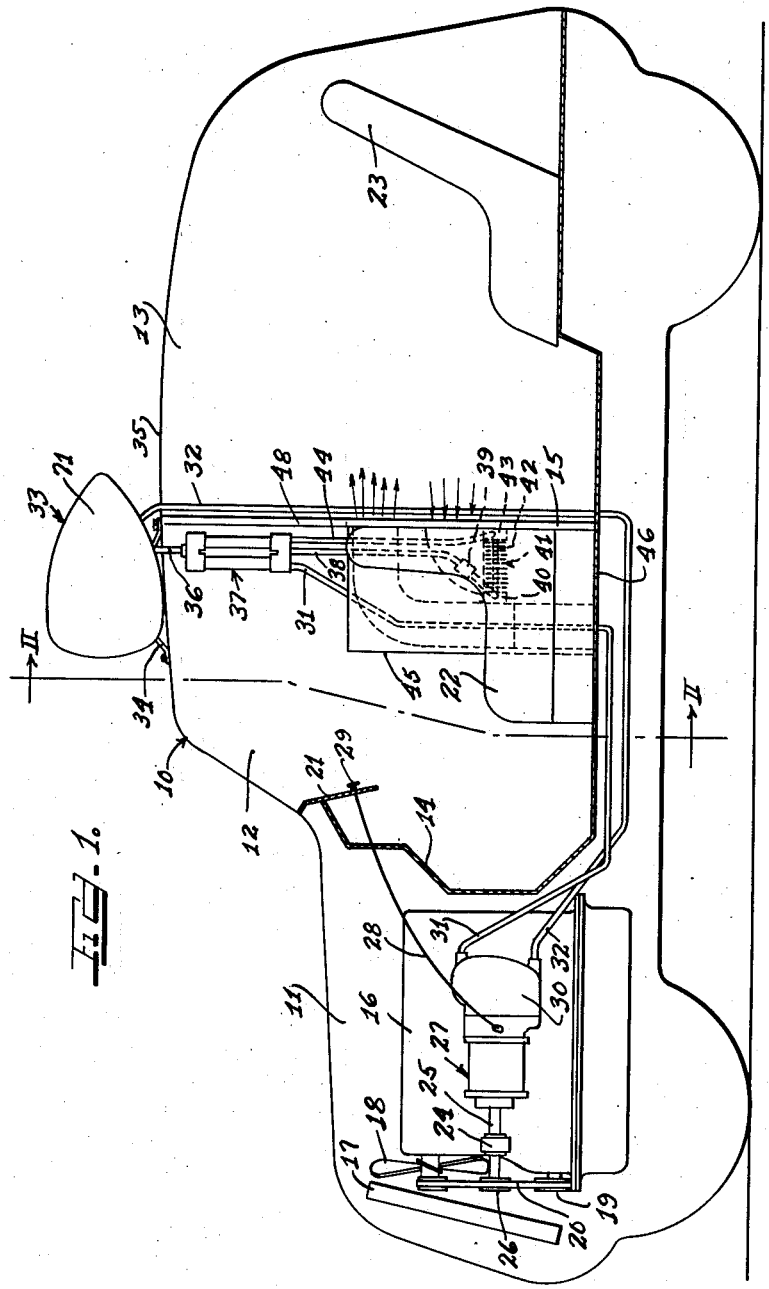

June 13, 1939.  H. W. McPHERSON ET AL  2,162,512
AIR CONDITIONING SYSTEM FOR AUTOMOBILES
Filed Nov. 25, 1935  3 Sheets—Sheet 3
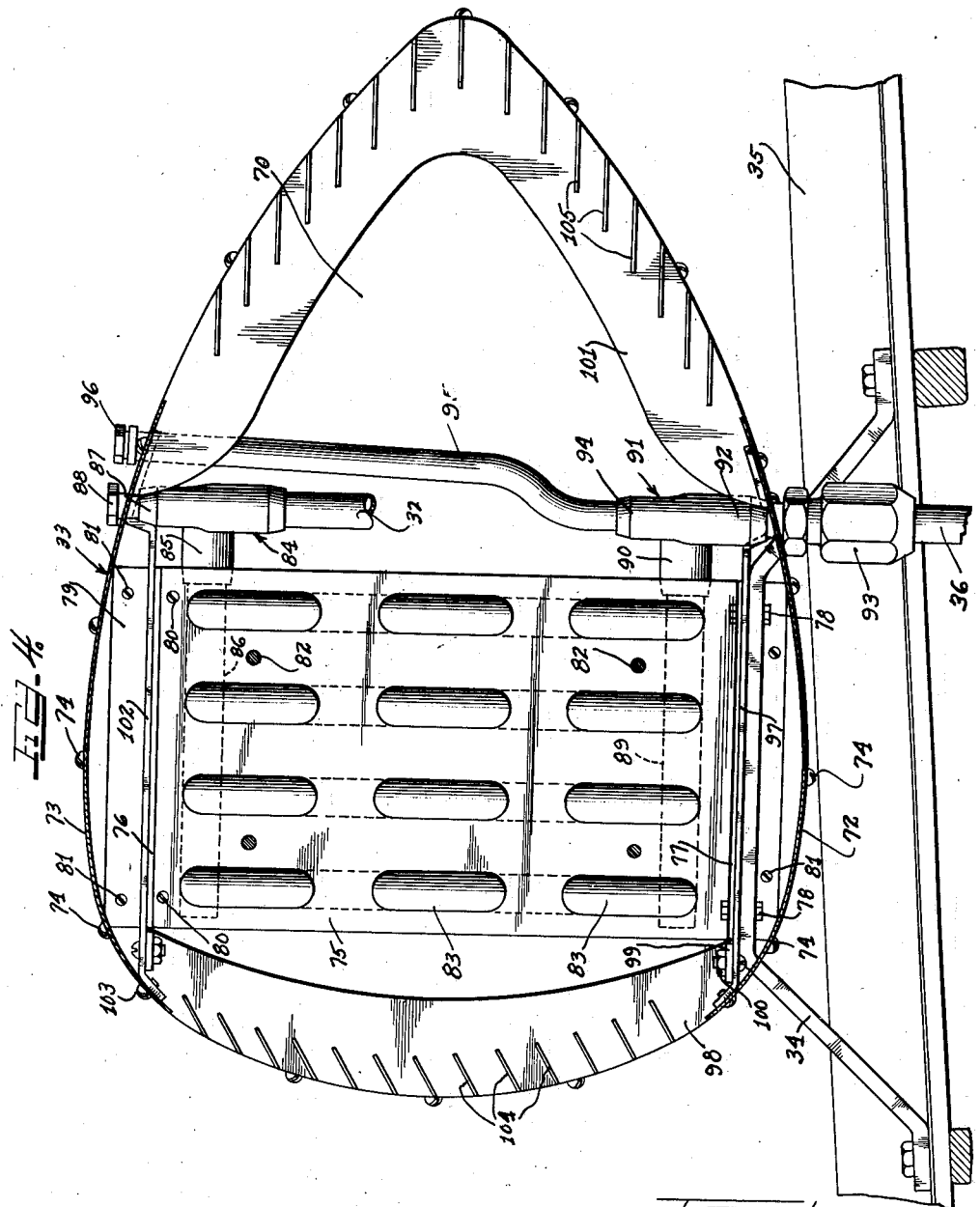
Inventors
Hal W. McPherson.
Harry L. Chisholm, Jr.
by Charles H. Field Attys.

Patented June 13, 1939

2,162,512

UNITED STATES PATENT OFFICE 2,162,512

AIR CONDITIONING SYSTEM FOR AUTOMOBILES

Hal W. McPherson and Harry L. Chisholm, Jr., Buffalo, N. Y., assignors to Houde Engineering Corporation, Buffalo, N. Y., a corporation of New York Application November 25, 1935, Serial No. 51,386

10 Claims. (Cl. 62—117)

This invention relates to an air conditioning system for self-propelled vehicles that is actuated by the motor of such vehicles for cooling the air in a compartment of the vehicle.

More specifically this invention relates to an air conditioning system for cooling the passenger compartment of taxicabs and limousines or the storage space of delivery trucks and is provided with a condenser located on the roof of the vehicle, a cooling coil or evaporator unit located in the driver's compartment of the vehicle and means for circulating air over said coil or unit for distribution to the passenger compartment or storage space.

In refrigerating systems of the compressor-evaporator type it is desirable to cool the compressed refrigerant as much as possible before delivering it to the evaporator unit or cooling coil for expansion and absorption of heat therefrom. It is therefore desirable to have the condenser of such system in free contact with air or other cooling fluid for reducing the temperature of the refrigerant flowing through the condenser.

Furthermore in refrigerating systems using a refrigerant which is liquefied in the condenser it has heretofore been considered necessary to provide a receiving tank for the liquefied refrigerant to collect the same for supplying the evaporator as it is needed therein.

In accordance with our present invention we have now provided an air conditioning system for self-propelled vehicles in which the condenser is mounted on the roof of the vehicle in free contact with the outside air but, at the same time, shielded from the sun. Our invention also dispenses with the necessity of a separate receiver for liquid refrigerant since the evaporator unit is mounted in spaced relation below the condenser in the vehicle body and a hydrostatic head of liquid refrigerant is always provided above the evaporator unit in the tube connecting the condenser with the unit. However, our invention also includes the use of a heat exchanger which can serve as a receiver for liquid refrigerant for further cooling the liquid refrigerant from the condenser with spent expanded refrigerant from the evaporator unit.

Our air conditioning is especially well adapted for use in taxicabs, limousines and delivery trucks where the driver's compartment is separated from the passenger compartment or storage space to be cooled. Obviously, however, the system can be used in other types of automotive vehicles.

It is therefore an object of this invention to provide an air conditioning system for self-propelled vehicles having the refrigerant condenser of the system mounted on the roof of the vehicle.

A further object of this invention is to provide an air conditioning system for automotive vehicles having a passenger or storage compartment separated from the driver's compartment.

Another object of this invention is to provide a refrigerator system of the compressor-evaporator type using a refrigerant that is liquefied by flowing through a condenser and having a heat exchange receiver for the liquefied refrigerant that is cooled with expanded refrigerant from the evaporator.

Another object of this invention is to provide an air conditioning system for cooling the passenger compartment of limousines and taxicabs that is driven by power supplied from the motor of such vehicle.

Another object of this invention is to provide a refrigerant condenser for mounting on the roof of moving vehicles.

Other and further objects of this invention will be apparent from the following detailed description of the annexed sheets of drawings which disclose a preferred embodiment of the invention.

On the drawings:

Figure 1 is a side elevational view of an air conditioning system according to this invention mounted on an automobile of the taxicab or limousine type and illustrating the automobile in diagrammatic form.

Figure 2 is a vertical cross-sectional view taken substantially along the line II—II of Figure 1.

Figure 3 is a vertical cross-sectional view taken substantially along the line III—III of Figure 2 but showing the cooling apparatus for liquefied refrigerant as being mounted outside of the box containing the evaporator unit for purposes of clarity.

Figure 3A is a diagrammatic elevational view with parts in vertical cross section illustrating an alternative arrangement for driving the blower shown in Figures 2 and 3.

Figure 4 is an enlarged cross-sectional view, with parts in elevation, taken substantially along the line IV—IV of Figure 2.

As shown on the drawings:

In Figure 1 the reference numeral 10 indicates generally an automobile of the taxicab or limousine type having a motor compartment 11, a driver's compartment 12 and a passenger compartment 13 separated from each other by partition walls 14 and 15 respectively.

The motor compartment 11 has mounted therein the usual internal combustion engine 16 for propelling the vehicle and as is customary the motor 16 is cooled by a cooling system including a radiator 17 mounted in front of the motor and a fan 18 for drawing air through the radiator. The fan 18 is driven by a pulley 19 located on the end of the crank shaft of the motor through a fan belt 20.

The driver's compartment 12 contains the usual dashboard or instrument panel 21 and the driver's seat 22.

The passenger compartment 13 contains the usual seat 23 for the passengers and according to this invention, this compartment 13 is to be cooled by apparatus mounted in the operator's compartment 12 and driven by additional apparatus mounted on the motor 16 in the motor compartment 11.

In accordance with this invention a shaft housing 24 is mounted on the block of the motor 16 for rotatably carrying a shaft 25 which extends therethrough and has a pulley 26 secured at one end thereof for engagement with the fan belt 20 to be driven by the fan belt. The shaft 25 rotates the driven member of a centrifugal throw-out clutch indicated generally at 27. The clutch 27 may be of the usual centrifugal type wherein weights are provided to disengage the driven member from the driving member when the speed of the driven member exceeds a certain desired range. However we prefer to use a centrifugal throw-out clutch of the type more fully described and claimed in the copending application of Ralph F. Peo entitled: "Governor clutch", Serial No. 24,307, filed May 31, 1935. As described in that application the clutch 27 has a Bowden wire disengaging means which can be operated through the Bowden wire 28 from a knob or handle 29 mounted on the dashboard 21 of the vehicle.

The clutch 27 drives a rotary compressor 30 of any standard make adapted to suck refrigerant under reduced pressure from an expanded refrigerant tube 31 and discharge the refrigerant at higher pressure through a compressed refrigerant tube 32.

As shown in Figure 1 the tube 32 for the compressed refrigerant communicates with a condenser indicated generally at 33 and more fully hereinafter described, mounted on brackets 34 on the roof 35 of the vehicle.

As will be hereinafter described the compressed refrigerant from the tube 32 flows through the heat exchanger coils in the condenser 33 and, in the case of our preferred refrigerant, methylene chloride ($CH_2Cl_2$) is condensed to a liquefied form and discharged in liquid form through a tube 36 into a heat exchanger indicated generally at 37 and more fully hereinafter described wherein it is further cooled by expanded refrigerant flowing into the return tube 31.

From the heat exchanger 37 the liquefied and now cooled refrigerant flows downwardly through a tube 38 into an expansion valve 39 from which it is expanded as needed into the inlet header 40 of an evaporator unit indicated generally at 41 and containing a plurality of heat transfer tubes such as 42 for expansion of the refrigerant to cool the tubes and the surrounding atmosphere. The expanded refrigerant from the evaporator unit 41 is collected into the discharge header 43 of the unit and drawn upward through the tube 44 and through the heat exchanger 37 into the return line 31 by the compressor 30.

The expansion valve 39 and evaporator unit 41 are mounted within a box or cabinet 45 which is positioned alongside of the driver's seat 22 in the compartment 12 of the vehicle 10.

As best shown in Figure 2 the box 45 can be mounted on the floor 46 of the driver's compartment 12 and extends upwardly along the partition wall 15 but terminates below the glass windows 47 and 48 usually provided in taxicabs and limousines between the driver's compartment and the passenger compartment.

The box 45 as shown in Figures 2 and 3 has an inlet duct 49 for receiving air to be conditioned from the passenger compartment 13.

The evaporator unit 41 is mounted in the duct 49 so that any air passing through the duct 49 must have extended contact with the cooling coils 42 of the evaporator unit. The air is drawn through the duct 49 by a centrifugal blower 50 mounted in the box 45 at the bottom thereof and driven by a small electrical motor 51 also mounted in the box or an extension of the box as shown in Figure 3. The motor 51 is energized from the battery 52 of the vehicle and is controlled by a switch 53 conveniently located alongside of the driver's seat 22. Obviously the switch 53 may also be positioned on the dashboard 21 of the vehicle if desired.

The blower 50 draws the air through the duct 49 and propels it through an outlet duct 54 also mounted in the box 45. Obviously the box 45 and the partition wall 15 have openings therethrough registering with the mouths of the ducts 49 and 54 and as shown in Figure 1, air is circulated from the passenger compartment 13 of the vehicle 10 through the inlet duct 49 where it is cooled by the evaporator unit 41. The cooled air is then projected back into the passenger compartment 13 preferably at a higher level than the intake level and is circulated around the passenger compartment for cooling the compartment.

If desired the rotor or fan of the blower 50 can be driven mechanically from the governor clutch 27 as shown in Figure 3A. As shown, the pilot shaft 27a of the driven clutch member 27b has a small diameter shaft 27c extending therefrom and telescoped in the drive shaft 25a which is driven by the pulley 26a through the fan belt 20a. A flexible shaft 27d, similar to a speedometer cable, is secured to the small shaft 27c and rotated thereby whenever the clutch member 27b is engaged for operation. The shaft 27d can be readily extended into a blower such as 50 (Fig. 3) to rotate the rotor therein illustrated for purpose of convenience as a fan 27e in Figure 3A. Thus both the compressor and blower can be driven by the governor clutch 27 and it is not necessary to use the automobile battery for energizing any part of the system.

As shown in Figure 2 the heat exchanger 37 may be mounted, if desired, within the box 45.

For purposes of illustration the heat exchanger receiver 37 is enlarged in Figure 3 and shown mounted outside of the box 45. The heat exchanger 37 comprises a pair of spaced opposed headers 55 and 56 connected by enlarged outside pipes 57 and 58 having smaller tubes 59 and 60 therein. The tube 60 communicates with the discharge tube 44 from the outlet header 43 of the evaporator unit 41 and the expanded refrigerant from the evaporator unit flows up from this tube through the tube 60 around an elbow 61 in the header 55 and through the tube 59 into the return line 31 back to the compressor pump.

The condensed refrigerant from the condenser 33 flows through the tube 36 into the header 55 and thence downwardly through the pipes 57 and 58 into the header 56 and into the feed line 38 for the evaporator unit 41. However, as the refrigerant flows through the pipes 57 and 58 it is cooled by the expanded refrigerant flowing from the evaporator since this expanded refrigerant is still cold. It is very desirable to transfer any cooling effect from the spent refrigerant to the incoming refrigerant so as to obtain a higher cooling capacity for the evaporator unit 41.

The condensed refrigerant from the condenser 33 can obviously be collected for use, as needed, in the heat exchanger 37 which thus acts as a receiver and maintains the collected refrigerant therein in a cooled condition.

As shown in Figures 1, 2 and 4, the condenser 33 comprises two end members 70 and 71 which can be formed of wooden blocks, metal plates, or molded plastic material such as for example "Bakelite" or hard rubber. Sheet metal plates 72 and 73 are bolted onto the end blocks 70 and 71 on the bottom and top thereof by bolts such as 74. These plates are preferably curved to conform with a streamlined contour of the end blocks 70 and 71.

Steel plates such as 75 (Figure 4) are disposed within the end blocks 70 and 71 and are provided with top and bottom flanges 76 and 77 respectively. The bottom flanges 77 of the plates 75 are securely bolted on the supporting brackets 34 by means of bolts such as 78. The plates 75 are therefore rigidly held in vertical position directly on the supporting brackets 34.

Secondary plates such as 79 are disposed between the plates 75 but extend beyond these plates as shown in Figure 4. The plates 79 can be directly bolted to the plates 75 by means of bolts 80 and are also bolted to the blocks 70 and 71 by bolts such as 81. In addition, draw bolts such as 82 can be inserted through the plates 75 and 79 and secured to the blocks 70 and 71 to hold these blocks against the plates and thus support the blocks from the brackets 34.

The plates 75 and 79 have openings therethrough for receiving the ends of the cooling tubes which extend longitudinally across the length of the condenser. The ends of the tubes (not shown) are fitted into elbows such as 83 arranged to provide a circuitous path for compressed refrigerant flowing through the tube 32 from the compressor 30 as shown in Figure 1, and through a T-coupling 84 mounted in the condenser 33 and having one branch 85 thereof communicating with a distributing header 86 at the top of the condenser for feeding the compressed refrigerant into the cooling tubes connected by the elbows 83. The other branch 87 of the T-coupling 84 is closed with a plug 88 extending through the top of the condenser 33 to provide means for charging the system with refrigerant.

Refrigerant from the header 86 flows through the cooling tubes downwardly through the condenser and is condensed. The condensed refrigerant is collected in a bottom header 89 communicating with a branch 90 of another T-coupling 91. One of the branches 92 of the coupling 91 communicates with the supply tube 36 leading to the heat exchanger 37 as described above. The tube 36 is secured to the coupling 1 in the usual manner by a coupling assembly indicated generally at 93.

The other branch 94 of the coupling 91 receives a tube 95 which extends upwardly through the top of the condenser 33 and is closed with a plug 96. The plug 96 can be removed for purging the refrigerating system free from entrapped air.

Purging of the system can be effected by running the compressor pump and either heating or preventing air circulation through the condenser for building up a pressure in the high side of the evaporating system. Air, being lighter than the refrigerant is collected at the top of the condenser and can be blown off by the thus generated pressure within the high side of the system by removing the plug 96.

A plurality of bottom brackets such as 97 are secured at spaced intervals along the plate 72. These brackets such as 97 receive ribs or strut members 98 at the front end thereof which carry horizontal tabs 99 that may be bolted to the brackets 97 by means of bolts 100.

Struts 101 are also secured to the rear end of the brackets such as 97.

The top plate 73 of the condenser also has a plurality of brackets such as 102 spaced therealong and secured thereto by means of bolts such as 103. The tops of the struts 98 and 101 are likewise secured to the upper brackets 102.

The struts 98 carry louvers or directing fins 104 which, as shown in Figure 2, extend across the entire front end of the condenser 33 between the end blocks 70 and 71. Likewise the rear struts 101 carry louvers or fins 105 extending across the entire rear end of the condenser unit.

Air is thus caused to circulate, by the forward motion of the vehicle 10 through the condenser 33 and as it enters into the condenser it is given an upward direction by the louvers 104. This air is thus caused to have extended contact with the cooling tubes or radiating fins which can be provided around the tubes as is customary in condenser construction. The air upon leaving the condenser, however, is directed through the horizontally disposed louvers or fins 105 so that it has a backward movement parallel to the vehicle 10.

The louvers 104 and 105 also effectively radiate any of the sun's rays back outside of the condenser so that these rays do not strike the cooling tubes at any time.

If desired insulation material such as "Rockwool" or other fibrous insulator may be disposed above the cooling tubes to protect the same from the heat of the sun. If desired, for example, the insulator may be disposed between the top of the top row of tubes and the bottom of the top housing plate 73.

The condenser unit 33 as shown has a streamlined contour to lessen wind resistance and in many instances can be flattened even more than as shown in the drawings.

From the above description it should be evident that we have now provided an air conditioning system for automobiles which is driven by the motor of the automobile and which includes an efficient streamlined condenser mounted on the roof of the vehicle in free contact with the air. The condenser is specially designed to provide a maximum flow of air therethrough for contacting with the cooling coils while at the same time the cooling coils are protected against the sun's rays.

The air conditioning system of this invention is especially well adapted for use in taxicabs and limousines or other vehicles having a driver's compartment separated from the passenger or storage compartment to be air conditioned.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. In combination, an automobile of the taxicab or limousine type having a passenger compartment and a driver's compartment, a partition wall separating said compartments having air inlet and outlet openings therethrough, an air conditioning system for cooling the passenger compartment including a refrigerant evaporator unit mounted in the driver's compartment in front of the partition wall, a duct communicating with the inlet opening in said partition wall and with the evaporator unit, a blower for drawing air through said duct around said unit and an outlet duct communicating with the discharge side of the blower and the outlet opening of the partition wall for conveying cooled air propelled by the blower into the passenger compartment.

2. In combination with an automobile of the taxicab or limousine type having a passenger compartment and a driver's compartment separated therefrom, an air conditioning system for cooling the passenger compartment including a refrigerant evaporator mounted in the driver's compartment alongside of the driver's seat therein, a condenser mounted on the roof of the automobile for supplying condensed refrigerant to the evaporator unit and a blower for drawing air around the evaporator unit to be cooled by contact therewith and for propelling the cooled air into the passenger compartment.

3. In combination, an automobile having a compartment to be cooled, a driver's compartment separated therefrom and a motor compartment having a motor therein, a compressor in said motor compartment, means for driving said compressor from said motor, a condenser mounted on the roof of the automobile for receiving compressed refrigerant from the compressor, an expansion valve mounted in the driver's compartment, a tube for supplying condensed refrigerant from the condenser to the expansion valve, an evaporator unit for receiving expanded refrigerant from the expansion valve, a tube for conveying the expanded refrigerant to the inlet of the compressor and means for drawing air from the compartment to be cooled around the evaporator unit in the driver's compartment for circulation back into the compartment to be cooled.

4. In combination with an automobile of the taxicab or limousine type having a passenger compartment to be cooled and a driver's compartment separated therefrom, a compressor driven by the motor of said automobile mounted in the motor compartment of the automobile, a condenser mounted on the roof of the vehicle for receiving compressed refrigerant from the compressor, an evaporator unit mounted in the driver's compartment alongside of the driver's seat therein, a heat exchanger between said condenser and said evaporator unit for cooling refrigerant supplied by the condenser to the evaporator unit and a blower for circulating air from said passenger compartment around said evaporator unit to be cooled by contact therewith and for propelling the cooled air back into the passenger compartment of the automobile.

5. In combination with an automobile of the limousine or taxicab type having a passenger compartment, a driver's compartment and a motor compartment each separated by partition walls, a container mounted in the driver's compartment alongside of the driver's seat in front of the partition wall between the passenger and driver's compartments, said partition wall having inlet and outlet openings therethrough, ducts in said container communicating with said openings, an evaporator unit in said container in one of the ducts therein, a blower in said container communicating with said ducts for drawing air from the passenger compartment through the inlet opening in the partition wall for circulation around the evaporator unit to be cooled by contact therewith and for propelling the cooled air back into the passenger compartment through the outlet opening of the partition wall.

6. An air conditioning system for automobiles comprising a compressor, means for driving the compressor from the motor of the automobile, a condenser mounted on the roof of the automobile in free contact with outside air, a tube for supplying compressed refrigerant from the compressor to the condenser, a heat exchanger, a tube for flowing condensed refrigerant from the condenser to said heat exchanger, an expansion valve in the automobile body for receiving refrigerant from the heat exchanger, an evaporator unit for receiving expanded refrigerant from the expansion valve, a tube for supplying expanded refrigerant from the evaporator unit to the heat exchanger for cooling the condensed refrigerant flowing therethrough and another tube for withdrawing expanded refrigerant from the heat exchanger back to the compressor to be compressed therein and means for circulating air around the evaporator unit to be cooled by contact therewith.

7. In combination with an automobile of the taxicab or limousine type having a compartment to be cooled, a driver's compartment separated therefrom and a motor compartment in front of the driver's compartment, an air-conditioning system of the compressor-condenser-evaporator type including a compressor driven by the motor of the automobile, a condenser mounted on the roof of the automobile, an evaporator unit mounted in the driver's compartment of the automobile and means energized by the battery of the automobile for circulating air from the passenger compartment into contact with the evaporator unit to be cooled thereby and for propelling the cooled air back into the passenger compartment.

8. In combination with an automobile having a space to be cooled, an air conditioning system of the compressor-condenser-evaporator type including a compressor mounted in the motor compartment of the automobile, a centrifugal throwout clutch for driving said compressor, a shaft driven by the fan belt assembly of the automobile motor for driving said clutch, a Bowden wire operable from the dash board of the automobile for disengaging said clutch, a condenser mounted on the roof of the automobile, an evaporator unit mounted in the body of the automobile and means for circulating air around the evaporator unit to be cooled by contact therewith.

9. In an automotive vehicle air conditioning system including a compressor, a heat exchanger operatively connected thereto, and a blower for circulating air around the heat exchanger, the improvements which comprise a centrifugal throw-out clutch set to disengage at a predetermined maximum speed, said clutch having a driven element rotated by the vehicle motor and a driving element for driving the compressor, and a flexible drive shaft coupling said driving element with the blower, whereby the compressor and blower are simultaneously disengaged at a predetermined maximum speed, irrespective of the speed of the motor, and said blower can be located in a convenient place on the vehicle.

10. In an automotive vehicle air conditioning system including a pump, a heat exchanger operatively connected thereto, and a blower for circulating air around the heat exchanger, the improvements which comprise a centrifugal throw-out clutch adapted to disengage at a predetermined maximum speed, said clutch having a driven member rotated by the vehicle motor and a driving member for driving the pump, and a shaft coupling said driving member with the blower, whereby the pump and blower are simultaneously disengaged at a predetermined maximum speed, irrespective of the speed of the motor.

HAL W. McPHERSON.
HARRY L. CHISHOLM, Jr.